June 24, 1958 R. K. ANDRES ET AL 2,840,815

RADIO MULTIPLEX COMMUNICATION SYSTEM

Filed June 23, 1955 5 Sheets-Sheet 1

INVENTORS
CLYDE H. BACKUS
& ROY K. ANDRES
BY Charles H. Brown
ATTORNEY

INVENTORS
CLYDE H. BACKUS
& ROY K. ANDRES
BY Charles H. Brown
ATTORNEY

RADIO MULTIPLEX COMMUNICATION SYSTEM

Filed June 23, 1955 5 Sheets-Sheet 3

INVENTORS
CLYDE H. BACKUS
& ROY K. ANDRES
BY Charles H. Brown
ATTORNEY

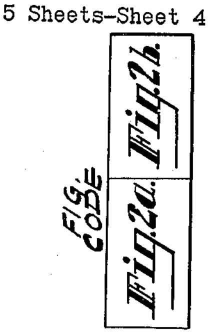
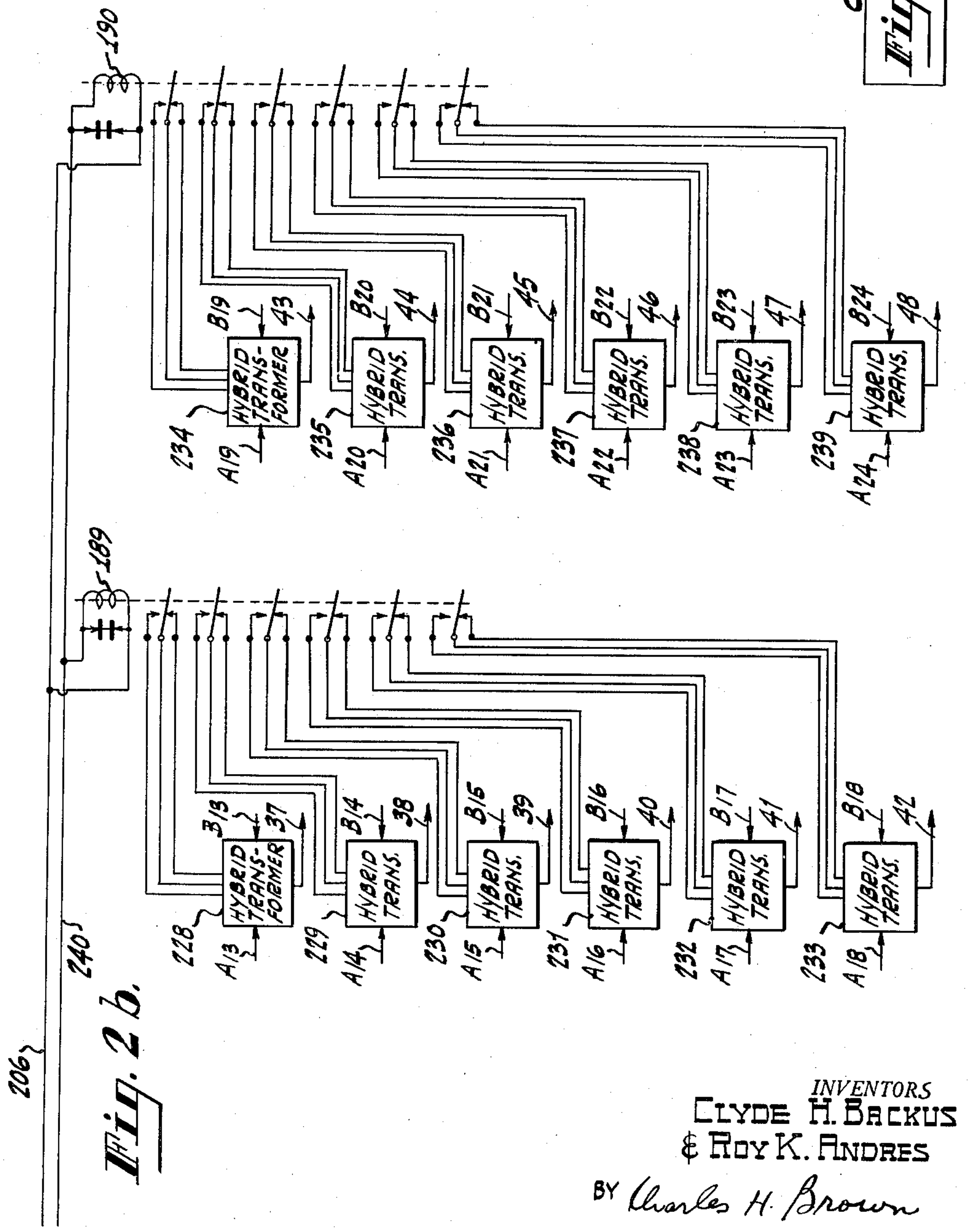
Fig. 2b.
INVENTORS
CLYDE H. BACKUS
& ROY K. ANDRES
BY Charles H. Brown
ATTORNEY

RADIO MULTIPLEX COMMUNICATION SYSTEM

Filed June 23, 1955 5 Sheets-Sheet 5

INVENTORS
CLYDE H. BACKUS &
ROY K. ANDRES

BY

Charles H. Brown

ATTORNEY

United States Patent Office 2,840,815

Patented June 24, 1958

2,840,815

RADIO MULTIPLEX COMMUNICATION SYSTEM

Roy K. Andres, Glen Cove, and Clyde H. Backus, Lynbrook, N. Y., assignors to Radio Corporation of America, a corporation of Delaware Application June 23, 1955, Serial No. 517,582

11 Claims. (Cl. 343—200)

Figure 1A:
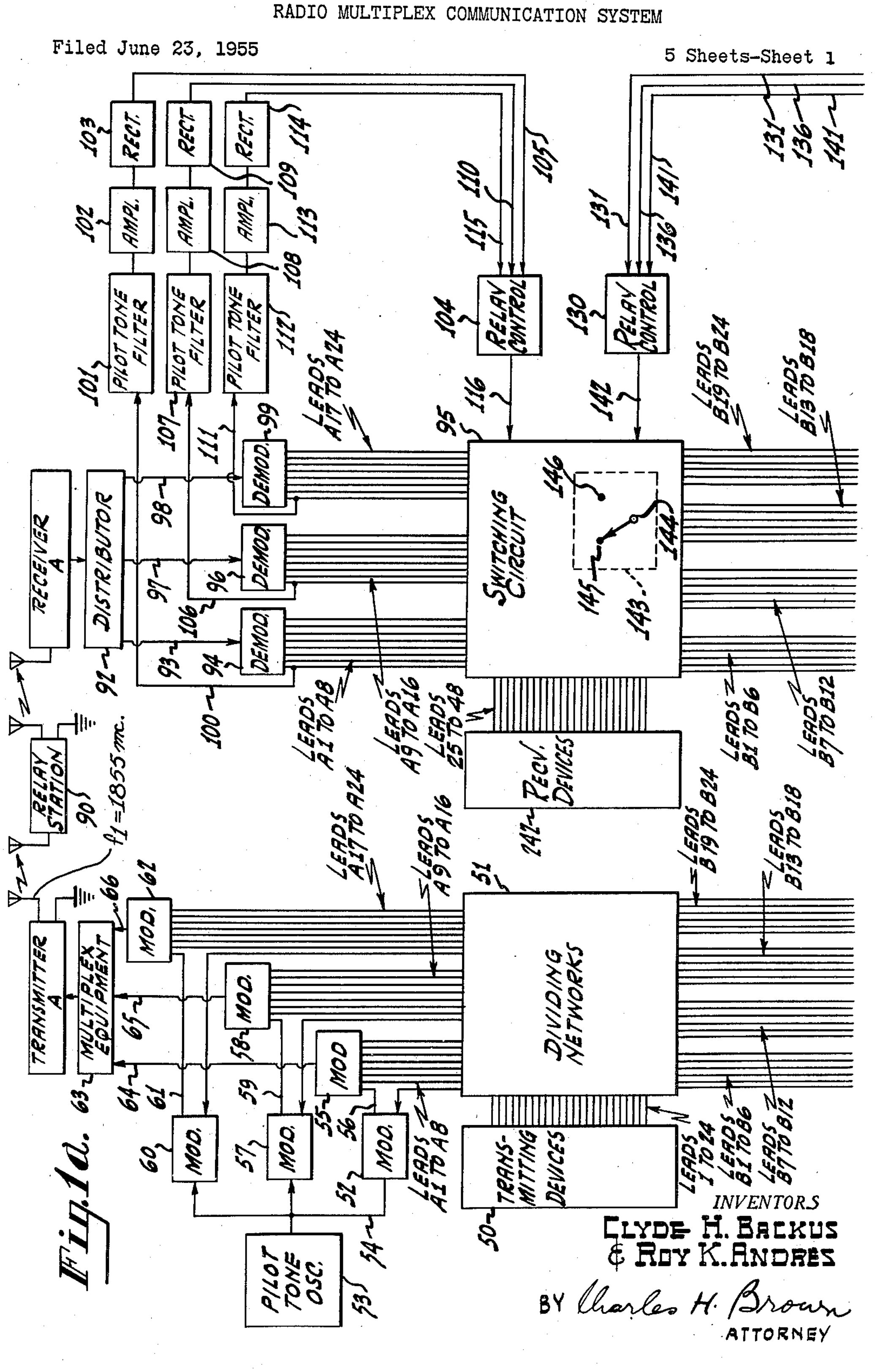

This invention relates to radio communication systems. Particularly, this invention is a communication system including means for simultaneously transmitting a plurality of message signals from a transmitting station to a receiving station over two separate multiplex transmission systems. A switching circuit is located at the receiving station and is selectively operated either automatically or manually to pass the message signals transmitted over one of the transmission systems to separate receiving devices.

The satisfactory operation of a radio communication system is dependent upon the failure-free operation of the radio equipment included in the system and upon atmospheric conditions which may fade or distort a radio signal preventing the proper reception thereof at a receiving station. When the operation of the communication system is interrupted by a breakdown of the radio equipment or by atmospheric conditions, time is lost in the transmission of messages by the system. Such loss of time in the transmission of messages often means considerable loss of revenue and causes unsatisfactory service to subscribers who are serviced by the radio communication system.

The invention has as one of its objects the provision of an improved radio communication system including means for reducing to a minimum the possibility of an interruption occurring in the operation of the system.

A further object of the invention is to provide, in a communication system of the type including means for simultaneously transmitting a plurality of message signals over two multiplex transmission systems, a novel type of switching circuit located at the receiving station of the system which is selectively operated either automatically or manually to pass the message signals transmitted over one of the multiplex transmission systems to separate receiving devices.

Briefly, the radio communication system of the invention includes a transmitting station at which is located transmitting equipment operated to simultaneously transmit a plurality of different message signals over separate leads to dividing networks. A first and a second group of leads are connected to the output circuits of the dividing networks, each of the groups including the same number of leads as are connected to the input circuits of the dividing networks. The message signals fed to the dividing networks are simultaneously passed through the dividing networks and over separate leads of each of the two groups of leads.

Means are provided at the transmitting station for applying a pilot tone to predetermined ones of the message signals transmitted over the first group of leads. The leads are connected to an electronic combining means which operates to combine the message signals fed over the leads and to feed the message signals in multiplex fashion over a single lead to a first radio frequency transmitter. The transmitter modulates a carrier with the multiplex signal and directively transmits the signal over a first wireless multiplex transmission system towards a remotely located radio receiving station.

Similarly, means are also provided at the transmitting station for applying a pilot tone to predetermined ones of the message signals transmitted over the second group of leads. The leads are connected to an electronic combining means which operates to combine the message signals and to feed the message signals in multiplex fashion over a single lead to a second radio frequency transmitter. The transmitter modulates a carrier with the multiplex signal and directively transmits the signal over a second wireless multiplex transmission system towards the same remotely located radio receiving station.

The radio communication system of the invention also includes a receiving station at which are located a first radio receiver tuned to receive the multiplex signal transmitted by the first radio frequency transmitter, and a second radio receiver tuned to receive the multiplex signal transmitted by the second radio frequency transmitter. The first multiplex transmission system, therefore, includes a radio frequency transmitter and a radio receiver, as does the second multiplex transmission system. The multiplex signals transmitted by the first and second radio frequency transmitters at the transmitting station are sufficiently different in frequency to permit the radio receivers at the receiving station to be selective to the two multiplex signals. The multiplex signal received by the first radio receiver at the receiving station is fed to an electronic distributing means which separates the various message signals from the multiplex signal and feeds them over separate leads to a switching circuit. The message signals to which a pilot tone was applied at the transmitting station are also fed over separate leads to different pilot tone filters. Each of the pilot tone filters operates to filter the pilot tone from the message signal received and to develop a voltage signal which is fed to a first relay control arrangement.

Similarly, the multiplex signal received by the second radio receiver is also fed to an electronic distributing means, different than that to which the signal received by the first radio receiver is fed, which separates the various message signals from the multiplex signal and feeds them over separate leads to the same switching circuit to which the message signals separated from the multiplex signal received by the first radio receiver are fed. The message signals to which pilot tones were applied at the transmitting station are also fed over separate leads from the distributing means to different pilot tone filters. Each of the pilot tone filters operates to filter the pilot tone from the message signal received and to develop a voltage signal which is fed to a second relay control arrangement.

The switching circuit to which the leads are connected that carry the message signals transmitted simultaneously over the two multiplex transmission systems, received by the first and second radio receivers, includes a control switch which is manually operated to control the sequence of operation of the switching circuit to pass the message signals received over the leads from either the first radio receiver or the second radio receiver to a plurality of receiving devices over separate leads. When both the first and the second multiplex transmission systems are operating properly, the pilot tones transmitted over both of the multiplex transmission systems will be received by the first and second radio receivers. The pilot tones will be filtered from the message signals to which they were applied and a signal will be fed to both the first and the second relay control arrangements indicating that a proper signal is being received over both transmission systems. In this situation, both the first and second relay control arrangements develop control signals which are fed over separate leads to the switching circuit.

An operator by selectively operating the control switch of the switching circuit can cause the switching circuit to operate to pass the message signals transmitted over one of the multiplex transmission systems which has been selected for use to a plurality of receiving devices over separate leads. The operation of the invention is based on the fact that, when the operation of the multiplex transmission system which is being used is interrupted due to the fading of the multiplex signal transmitted thereover by atmospheric conditions or to a breakdown in the operation of the equipment of the multiplex transmission system, the pilot tones which are transmitted over the particular multiplex transmission system utilized will also be interrupted. In the absence of pilot tones of the proper amplitude, the relay control arrangement normally placed in operation thereby, will discontinue the feeding of a control signal to the switching circuit. The switching circuit thereupon automatically disconnects the receiving devices at the receiving station from the leads to which they were previously connected and connects the receiving devices to the leads over which the message signals are being fed from the other radio receiver in the other multiplex transmission system which is operating properly, as indicated by the reception of the pilot tones at the receiving station transmitted over the other multiplex transmission system. Even though the switching circuit at the receiving station has been manually set by the operation of the control switch to pass the message signals received over a particular one of the multiplex transmission systems to the receiving devices at the receiving station, the switching circuit in accordance with the reception of the pilot tones over the respective multiplex transmission systems is automatically operated to select the transmission system over which a proper signal is being received. The switching circuit operates to maintain the operation of the radio communication system so long as a proper signal is being transmitted over at least one of the two multiplex transmission systems.

The switching circuit is arranged in such a manner that it will continue to pass the message signals transmitted over one of the transmission systems to the receiving devices at the receiving station until the operation of the system is interrupted or until the control switch of the switching circuit is manually operated to alter the sequence of operation of the switching circuit to utilize the other multiplex transmission system of the radio communication system. In other words, the switching circuit is locked on one or the other of the multiplex transmission systems and cannot needlessly oscillate or hunt between them in operation. It is important to note that at no time will the switching circuit be operated to simultaneously pass two similar message signals, fed thereto from the first radio receiver and from the second radio receiver, to a receiving device at the receiving station. The switching circuit is operated to select a message signal fed thereto from either the first radio receiver or from the second receiver but cannot select both at the same time.

Figure 1B:
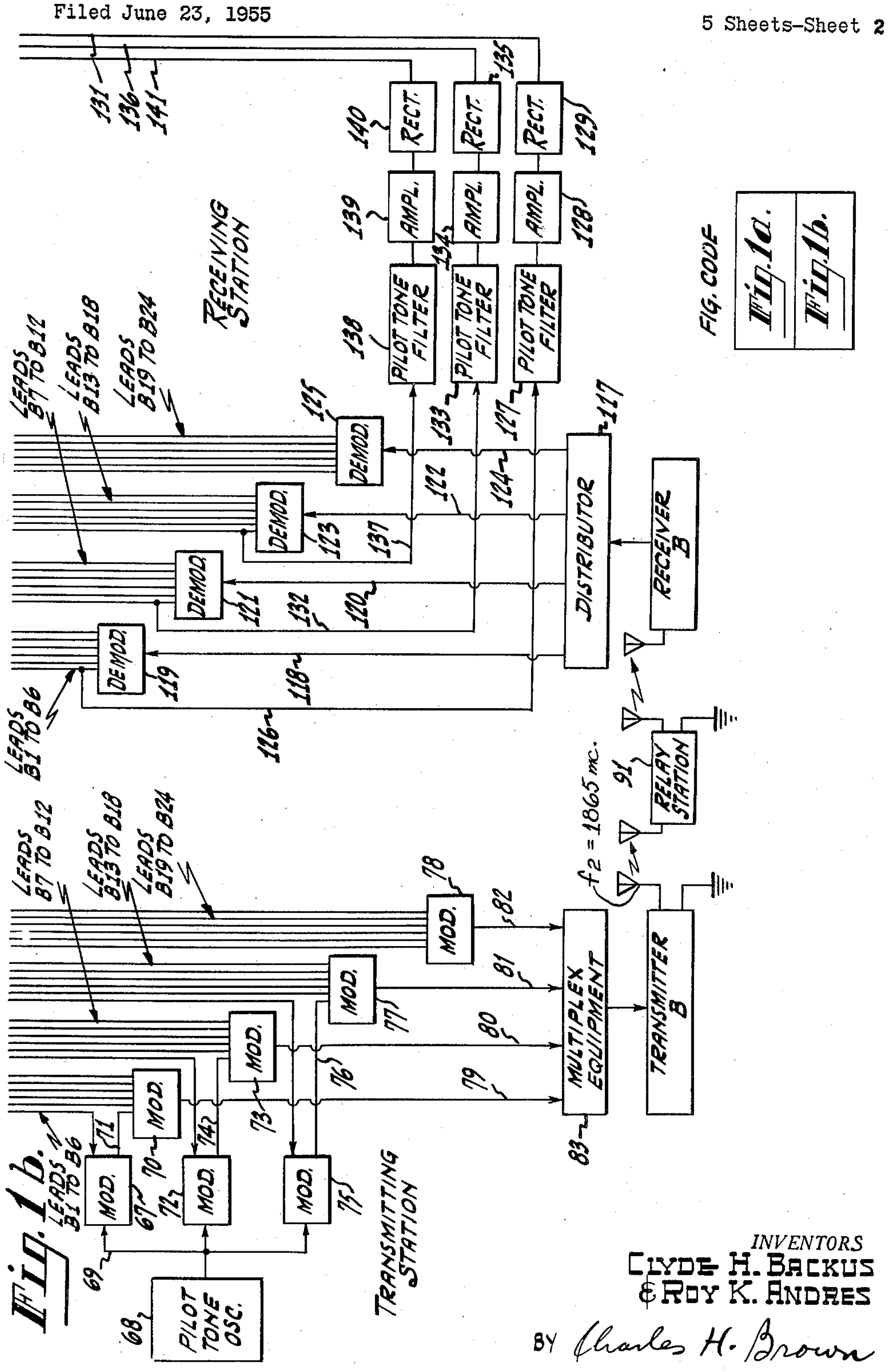
Figure 2D:
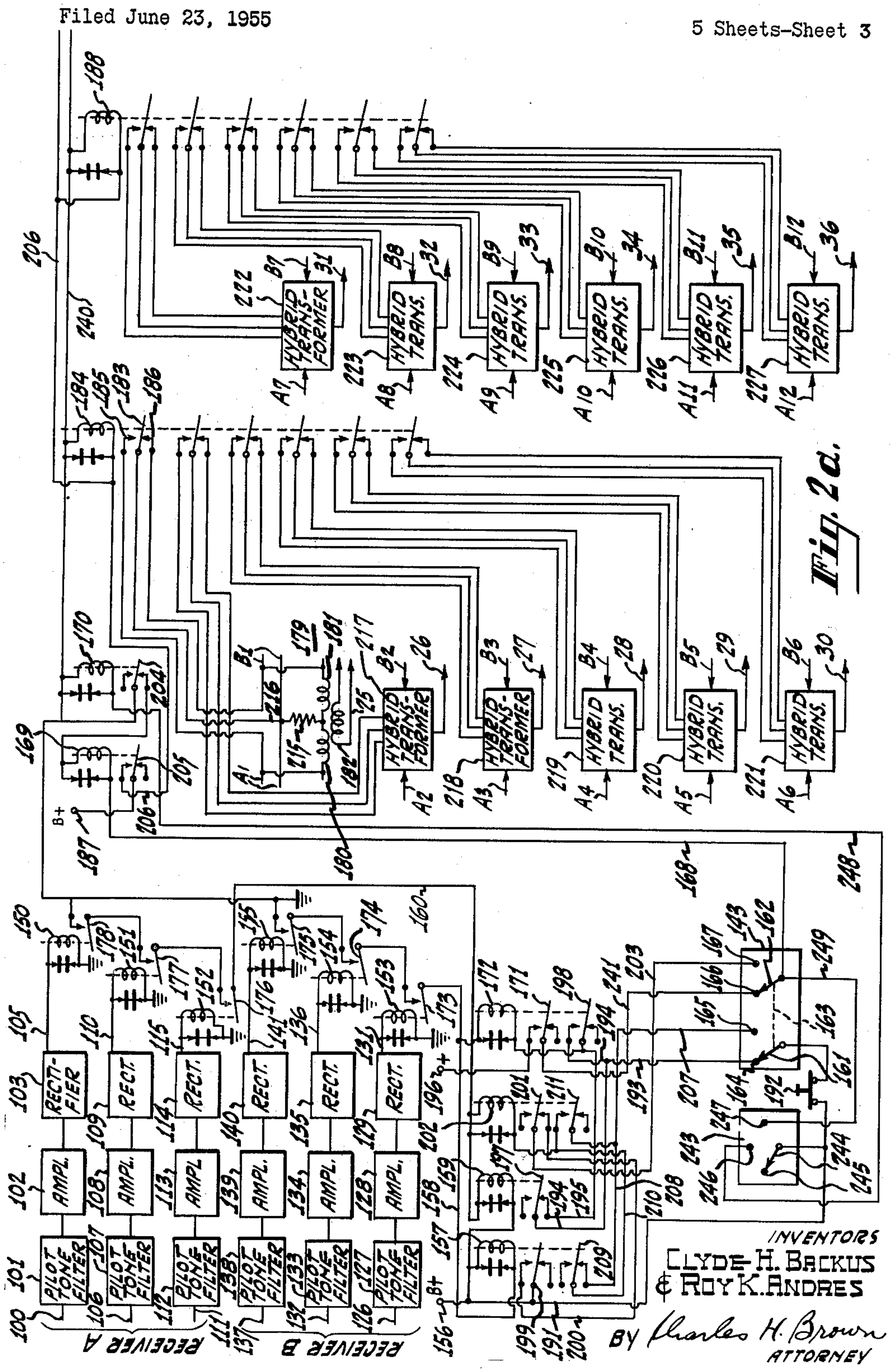
Figure 7:
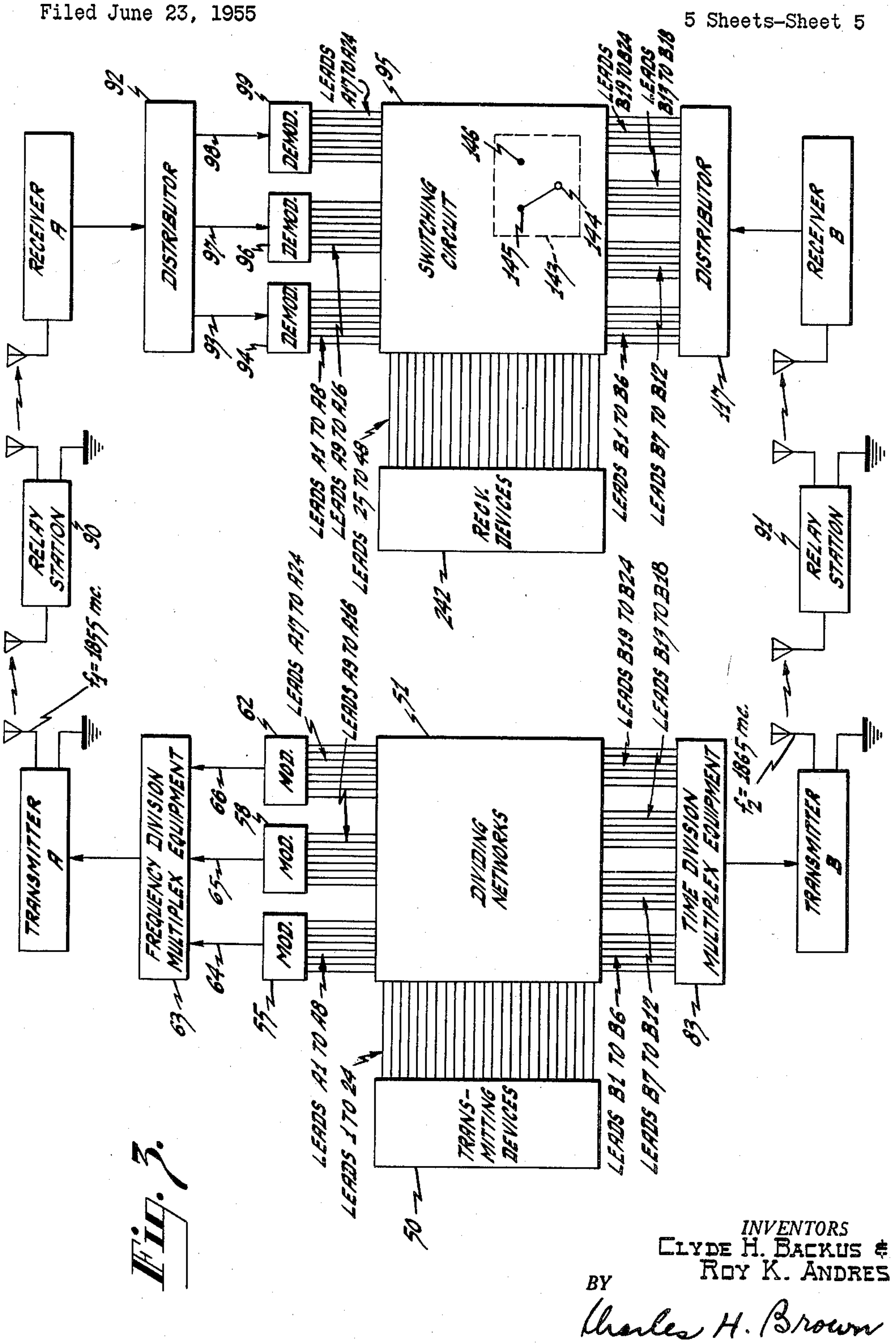

A more detailed description of the invention follows with reference to the accompanying drawing in which:

Figures 1*a* and 1*b* disclose a block diagram of a radio communication system constructed according to the invention and are assembled according to the code shown in the drawing;

Figures 2*a* and 2*b* disclose a circuit diagram of one embodiment of a switching circuit which may be adapted for use in the communication system of the invention, as shown in Figures 1*a* and 1*b*, and are assembled according to the code shown in the drawing; and Figure 3 shows a modification of the embodiment of the invention given in Figure 1.

Referring to Figures 1*a* and 1*b*, a plurality of transmitting devices 50 are operated to transmit message signals over a plurality of leads, 1 through 24, to dividing networks 51. A first group of leads, A1 through A24, is connected to the output circuits of the dividing networks 51, as is a second group of leads, B1 through B24, each of the groups of leads including the same number of leads as are connected to the input circuits of the networks 51 (twenty-four). The dividing networks 51 operate to simultaneously pass over the two groups of leads the message signals transmitted to the networks 51 from the transmitting devices 50. For example, the message signal transmitted from the transmitting devices 50 over the first lead 1 is simultaneously passed by one of the dividing networks 51 over the first lead A1 of the first group and the first lead B1 of the second group, the message signal transmitted over the second lead 2 is simultaneously passed by a second one of the dividing networks 51 over the second lead A2 of the first group and the second lead B2 of the second group and so forth. The first group of leads, A1 through A24, is divided into three sections, each section including eight leads. The first lead A1 of the first section of leads, A1 through A8, is connected to a modulator 52 to which is also connected a pilot tone oscillator 53. The modulator 52 modulates a carrier with the message signal transmitted to it over the lead A1 and with a pilot tone which is fed to the modulator 52 from the pilot tone oscillator 53 over a lead 54. The output signal of the modulator 52 is fed to a modulator 55 over a lead 56, the remaining leads of the first section, A2 through A8, also being connected to the modulator 55.

Similarly, the first lead A9 of the second section of leads, A9 through A16, is connected to a modulator 57 to which is also connected the pilot tone oscillator 53. The modulator 57 modulates a carrier with the message signal transmitted to it over lead A9 and with a pilot tone fed to the modulator 57 from the pilot tone oscillator 53 over lead 54. The output signal of modulator 57 is fed to a modulator 58 over lead 59, the remaining leads, A10 through A16, of the second section also being connected to the modulator 58. Also in the same manner, the first lead A17 of the third section of leads, A17 through A24, is connected to a modulator 60 to which is also connected the pilot tone oscillator 53. The modulator 60 modulates a carrier with the message signal transmitted to it over lead A17 and with a pilot tone fed to the modulator 60 from the pilot tone oscillator 53 over lead 54. The output signal of the modulator 60 is fed over a lead 61 to a modulator 62, the remaining leads, A18 through A24, of the third section also being connected to the modulator 62.

The modulator 55 modulates a carrier with the message signal to which a pilot tone has been applied and which is fed thereto over the lead 56 and with the message signals transmitted over leads A2 through A8, the output signal of the modulator 55 being fed to multiplex equipment 63 over a lead 64. The modulator 58 modulates a carrier with the message signal to which a pilot tone has been applied and which is fed thereto over lead 59 and with the message signals transmitted over leads A10 through A16, the output signal of the modulator 58 being fed to the multiplex equipment 63 over a lead 65. The modulator 62 modulates a carrier with the message signal to which a pilot tone has been applied and which is fed thereto over lead 61 and with the message signals transmitted over leads A18 through A24, the output signal of the modulator 62 being fed to the multiplex equipment 63 over lead 66. The multiplex equipment 63 operates to combine the message signals and to feed them in multiplex fashion to a radio frequency transmitter A which modulates a carrier of predetermined frequency with the multiplex signal and transmits the signal over a first wireless multiplex transmission system.

The second group of leads, B1 through B24, is divided into four sections, each section including six leads. The first lead B1 of the first section of leads, B1 through B6, is connected to a modulator 67 to which is also connected a pilot tone oscillator 68. The modulator 67 modulates a carrier with the message signal received over lead B1 and with a pilot tone fed to the modulator 67 from the pilot tone oscillator 68 over lead 69. The output signal of the modulator 67 is fed to a modulator 70 over lead 71, the remaining leads, B2 through B6, of the first section also being connected to the modulator 70. The first lead B7 of the second section of leads, B7 through B12, is connected to a modulator 72 to which is also connected the pilot tone oscillator 68. The modulator 72 modulates a carrier with the message signal fed thereto over lead B7 and with a pilot tone fed to the modulator 72 from the pilot tone oscillator 68 over lead 69. The output signal of modulator 72 is fed to a modulator 73 over lead 74, the remaining leads, B8 through B12, of the second section also being connected to the modulator 73. The first lead B13 of the third section of the leads, B13 through B18, is connected to a modulator 75 to which is also connected the pilot tone oscillator 68. The modulator 75 modulates a carrier with the message signal fed thereto over lead B13 and with a pilot tone fed to the modulator 75 from the pilot tone oscillator 68 over lead 69. The output signal of modulator 75 is fed to a modulator 77 over lead 76, the remaining leads, B14 through B18, of the third section also being connected to modulator 77. The leads, B19 through B24, of the fourth section of the leads are connected to modulator 78.

The modulator 70 modulates a carrier with the message signal to which a pilot tone has been applied and which is fed thereto over lead 71 and with the message signals fed to the modulator 70 over leads B2 through B6. The output signal of the modulator 70 is fed to multiplex equipment 83 over lead 79. Modulator 73 modulates a carrier with the message signal to which a pilot tone has been applied and which is fed thereto over lead 74 and with the message signals fed to the modulator 73 over leads B8 through B12. The output signal of the modulator 73 is fed to the multiplex equipment 83 over a lead 80. The modulator 77 modulates a carrier with the message signal to which a pilot tone has been applied and which is fed thereto over lead 76 and with the message signals fed thereto over leads B14 through B18. The output signal of the modulator 77 is fed to the multiplex equipment 83 over lead 81. The modulator 78 modulates a carrier with the message signals fed thereto over leads B19 through B24, the output signal of the modulator 78 being fed to the multiplex equipment 83 over lead 82. The multiplex equipment 83 combines the message signals fed over the leads 79, 80, 81 and 82 and feeds the message signals in multiplex fashion to radio frequency transmitter B which modulates a carrier of predetermined frequency with the multiplex signal and transmits the signal over a second wireless multiplex transmission system.

It may be seen, therefore, that the transmitting station of the communication system of the invention includes means for feeding a plurality of message signals over two paths, the message signals being fed over one of the paths to a radio frequency transmitter A and over the other path to a radio frequency transmitter B. It is to be understood that the arrangement of the transmitting station shown in Figures 1*a* and 1*b* is given only by way of example and that the invention is not limited thereto. The transmitting station shown in Figures 1*a* and 1*b* is arranged to accommodate the simultaneous transmission of twenty-four different message signals. The transmitting station, however, may be arranged to bring about the simultaneous transmission of any number of message signals desired. Further, one of the paths is shown as consisting of three sections of eight leads each, a pilot tone being applied to the message signal fed over the first lead in each section. The second path is shown as consisting of four sections of six leads each, a pilot tone being applied to the message signal fed over the first lead of each of the first three sections. The manner in which the leads in each of the two paths are sectionalized and the manner in which the pilot tones are applied to various ones of the message signals fed over the leads is a matter of discretion. The number of pilot tones which are used and the manner in which they are applied to the message signals is dependent upon the equipment available and the manner in which the radio communication system of the invention is to be used. It is to be pointed out, however, that the particular system of applying pilot tones as shown was selected in order to effect maximum reliability by having the successful reproduction of the pilot tones involve the maximum amount of equipment. While the particular system shown in Figure 1*b* shows the application of a pilot tone to only three of the four sections described, for simplicity, it is to be understood that in the particular modulation system and/or multiplexing system used, any degree of failure protection desired may be attained through the application of pilot tones, for failure indications, to as much or as little of the parts of the system as desired.

The radio communication system of the invention is particularly adaptable for use in a microwave relay transmission system, as shown in Figures 1*a* and 1*b*. The multiplex signal transmitted by the radio frequency transmitter A at a desired frequency $f_1$, for example, 1855 mc., is preferably transmitted over a highly directional antenna. This signal is received and retransmitted by repeating relay station 90 over directional receiving and transmitting antennas, respectively, to a remotely located terminal radio receiver A located at the receiving station of the radio communication system. Similarly, the multiplex signal directively transmitted by radio frequency transmitter B at a second frequency $f_2$, for example, 1865 mc., is received and retransmitted by repeating relay station 91 to a remotely located terminal radio receiver B also located at the receiving station of the radio communication system. It is preferred that the terminal radio receiver stations also have directive antennas pointed toward their respective relay stations from which they receive signals. While only one relay station is shown in Figures 1*a* and 1*b* in each of the two multiplex transmission systems, any number of relay stations may be used, as is well known in the art. The frequency of the multiplex signal transmitted by the radio frequency transmitter A and the frequency of the multiplex signal transmitted by the radio frequency transmitter B are sufficiently different so that the radio receivers A and B at the receiving station are selective to the signals. The radio receiver A is tuned to be selective to the multiplex signal transmitted by the radio frequency transmitter A via relay station 90. On the other hand, radio receiver B is tuned to be selective to the multiplex signal transmitted by the radio frequency transmitter V via relay station 91.

Two separate multiplex transmission systems are, therefore, provided, the same message signals being simultaneously transmitted over both transmission systems. The multiplex transmission systems are located so as to be separate from one another and operate entirely independently of one another. In addition to operating at different frequencies, the two radio frequency transmitters A and B may be arranged to operate in a different manner. For example, the radio frequency transmitter A may be arranged to transmit a frequency division multiplex signal, while the radio frequency transmitter B is arranged to transmit a pulse amplitude modulated time division multiplex signal. It is to be further noted that if radio frequency transmitter B is operated in a pulse amplitude modulated time division multiplex system, the modulators 70, 73, 77, and 78 would not be necessary, as the individual message signals would be fed directly into the individual timing gates of the time division multiplexer 83. Figure 3 illustrates, by way of example only, the arrangement of the invention when a frequency division and time division multiplex transmission system are both used. The various circuits and equipments necessary for the transmission and reception of the pilot tones according to the invention have not been shown in Figure 3 for the sake of simplicity of drawing. Such circuits and equipments will be included in the arrangement of Figure 3 in exactly the same manner as in the arrangement of Figure 1. The transmitters A and B may be operated in any manner felt to be desirable in a particular application of the communication system of the invention.

The multiplex signal transmitted by the radio frequency transmitter A is received by the radio receiver A at the receiving station and fed to a distributor 92. The distributor 92 separates the signals originally combined into the multiplex signal by the multiplex equipment 63 at the transmitting station and feeds them over separate leads to demodulators 94, 96 and 99. The first signal is fed over lead 93 to the demodulator 94 which demodulates the signal and feeds the message signals over separate leads A1 through A8 to a switching circuit 95. Similarly, the second signal is fed from the distributor 92 over lead 97 to the demodulator 96 which demodulates the signal and feeds the message signals over leads A9 through A16 to switching circuit 95. The third signal is fed in the same manner from the distributor 92 over lead 98 to demodulator 99 which demodulates the signal and feeds the message signals over leads A17 through A24 to the switching circuit 95. The demodulators 94, 96 and 99, therefore, extract the message signals from the modulated carriers which are fed thereto from the distributor 92 and feed the message signals over separate leads to the switching circuit 95. For ease of description, the leads over which the message signals are fed from the demodulators 94, 96 and 99 are identified by the same letter and numeral designations as the corresponding leads at the transmitting station. The message signal transmitted over lead A1 at the transmitting station is fed at the receiving station from the demodulator 94 to the switching circuit 95 over lead A1 and so forth.

It will be remembered that means are provided at the transmitting station for applying a pilot tone to the message signals transmitted over three of the leads A1, A9 and A17. Therefore, the message signal fed over the lead A1 from the demodulator 94 will include the pilot tone. The message signal fed over lead A1 is also fed over lead 100 to a pilot tone filter 101. The pilot tone filter 101 operates to filter the pilot tone from the message signal and develops a voltage signal which is amplified by an amplifier 102, rectified by a rectifier 103 and fed to a relay control device 104 over lead 105.

The message signal fed over lead A9 from the demodulator 96 to the switching circuit 95 also includes a pilot tone. The message signal is, therefore, also fed from the demodulator 96 over lead 106 to a pilot tone filter 107. The pilot tone filter 107 operates to filter the pilot tone from the message signal and develops a voltage signal which is amplified by an amplifier 108, rectified by a rectifier 109 and fed to the relay control 104 over lead 110. The message signal fed from the demodulator 99 to the switching circuit 95 over lead A17 is also fed over lead 111 to a pilot tone filter 112 which operates to filter the pilot tone from the message signal and develops a voltage signal which is amplified by an amplifier 113, rectified by a rectifier 114 and fed to relay control 104 over lead 115. When a voltage signal is fed to the relay control 104 from each of the pilot tone filters 101, 107 and 112 over leads 105, 110 and 115, respectively, the relay control 104 is operated to feed a control signal to the switching circuit 95 over lead 116, as will be described in detail below.

The multiplex signal received by radio receiver B is fed to a distributor 117 which separates the signals originally combined into the multiplex signal by the multiplex equipment 83 at the transmitting station and feeds them over separate leads to different demodulators 119, 121, 123 and 125. The first signal is fed from the distributor 117 over lead 118 to demodulator 119. The demodulator 119 extracts the message signals from the signal and feeds the message signals over separate leads B1 through B6 to the switching circuit 95. The second signal is fed from the distributor 117 over lead 120 to demodulator 121. The demodulator 121 extracts the message signals from the signal and feeds the message signals over separate leads B7 through B12 to the switching circuit 95. A third signal is fed from the dstributor 117 over lead 122 to the demodulator 123. The demodulator 123 extracts the message signals from the signal and feeds the message signals over separate leads B13 through B18 to the switching circuit 95. The fourth signal is fed from the distributor 117 over lead 124 to demodulator 125. The demodulator 125 extracts the message signals from the signal and feeds the message signals over separate leads B19 through B24 to the switching circuit 95. For ease of description, the leads over which the message signals are fed from the demodulators 119, 121, 123 and 125 have been given the same letter and numeral designation as the corresponding leads at the transmitting station. A message signal transmitted over lead B1 at the transmitting station is fed at the receiving station from demodulator 119 to the switching circuit 95 over lead B1 and so forth.

A message signal originally transmitted by one of the transmitting devices 50 at the transmitting station simultaneously over leads A1 and B1 at the transmitting station will be received by the radio receivers A and B at the receiving station and will simultaneously be fed over the leads A1 and B1 at the receiving station. A message signal transmitted by a second one of the transmitting devices 50 at the transmitting station simultaneously over leads A2 and B2 at the transmitting station will be received by the radio receivers A and B at the receiving station and simultaneously fed over the leads A2 and B2 at the receiving station and so forth.

It will be remembered that means are provided at the transmitting station for applying a pilot tone to the message signals fed over three of the leads B1, B7 and B13. The message signals fed over the leads B1, B7, and B13 at the receiving station will, therefore, include a pilot tone. The message signal fed from the demodulator 119 over lead B1 at the receiving station is also fed over lead 126 to a pilot tone filter 127. The pilot tone filter 127 operates to filter the pilot tone from the message signal and develops a voltage signal which is amplified by an amplifier 128, rectified by a rectifier 129 and fed to a relay control device 130 over lead 131. The message signal fed from the demodulator 121 over lead B7 at the receiving station is also fed over lead 132 to a pilot tone filter 133 which filters the pilot tone from the message signal and develops a voltage signal which is amplified by an amplifier 134, rectified by a rectifier 135 and fed to relay control 130 over lead 136. The message signal fed from the demodulator 123 over lead B13 is also fed over lead 137 to a pilot tone filter 138. The pilot tone filter 138 operates to filter the pilot tone from the message signal and develops a voltage signal which is amplified by an amplifier 139, rectified by a rectifier 140 and fed to relay control 130 over a lead 141. When each of the pilot tone filters 138, 133 and 127 operates in response to the reception of a pilot tone to feed a voltage signal over leads 141, 136, and 131, respectively, the relay control 130 operates to feed a control signal to the switching circuit 95 over lead 142, as will be more fully described below.

The switching circuit 95 includes a control switch 143. The control switch, in turn, includes a wiper arm 144 and a pair of contacts 145 and 146. A plurality of leads, 25 through 48, are connected to the output circuit of the switching circuit 95. An operator by manually positioning the wiper arm 144 of the control switch 143 at either contact 145 or 146 determines the sequence of operation of the switch circuit 95. It has already been pointed out that the message signals of the multiplex signal received by radio receiver A are fed to the switching circuit 95 over separate leads A1 through A24 and that the message signals of the multiplex signal received by the radio receiver B are fed to the switching circuit 95 over separate leads B1 through B24. When the wiper arm 144 of control switch 143 is positioned at contact 145, the switching circuit 95 is operated to pass the message signals fed over the leads A1 through A24 from the radio receiver A over separate leads 25 through 48 to the receiving devices 242 at the receiving station. On the other hand, when the wiper arm 144 of the control switch 143 is positioned at contact 146, the message signals fed over the leads B1 through B24 from the radio receiver B are passed by the switching circuit 95 over the separate leads 25 through 48 to the receiving devices 242 at the receiving station. The switching circuit 95, therefore, is manually operated to pass the message signals transmitted over one of the multiplex transmission systems and received by either radio receiver A or radio receiver B to the receiving devices 242 at the receiving station. The message signals transmitted simultaneously over the two multiplex transmission systems will be simultaneously fed to the switching circuit 95 from the radio receivers A and B.

A more complete understanding of the invention will be obtained by an examination of Figures 2*a* and 2*b*, Figures 2*a* and 2*b* being assembled according to code included in the drawing. Figures 2*a* and 2*b* disclose a circuit diagram of one embodiment of a switching circuit which may be adapted for use in the radio communication system of the invention. Referring to Figure 2*a*, it will first be assumed that a multiplex signal of the proper amplitude and quality is being transmitted over both of the multiplex transmission systems of the radio communication system and is being received by the radio receivers A and B at the receiving station. As pointed out above, when a proper signal is received by the radio receiver A, a message signal to which a pilot tone has been applied is forwarded over lead 100 to a pilot tone filter 101. Pilot tone filter 101 operates to filter the pilot tone from the signal and develops a voltage signal which is amplified by an amplifier 102 and rectified by a rectifier 103. The resulting D. C. (direct current) voltage is fed from the rectifier 103 to ground over a path including lead 105 and the winding of a relay 150. The term ground, as used in the specification, is to be considered a point of fixed or zero alternating reference potential. A second message signal to which a pilot tone has been applied is fed over lead 106 to a pilot tone filter 107 which operates to filter the pilot tone from the signal and develops a voltage signal which is amplified by an amplifier 108 and rectified by a rectifier 109. The resulting D. C. voltage is fed from the rectifier 109 to ground over a path including lead 110 and the winding of a relay 151. A third message signal to which a pilot tone has been applied is fed over lead 111 to a pilot tone filter 112 which operates to filter the pilot tone from the signal and develops a voltage signal which is amplified by an amplifier 113 and rectified by a rectifier 114. The resulting D. C. voltage is fed from the rectifier 114 to ground over a path includnig lead 115 and the winding of a relay 152.

When a proper multiplex signal is received by the radio receiver B, a message signal to which a pilot tone has been applied is fed over lead 126 to a pilot tone filter 127. The pilot tone filter 127 operates to filter the pilot tone from the signal and develops a voltage signal which is amplified by a amplifier 128 and rectified by a rectifier 129. The resulting D. C. voltage is fed to ground over a path including lead 131 and the winding of a relay 153. A second message signal to which a pilot tone has been applied is fed over lead 132 to a pilot tone filter 133 which operates to filter the pilot tone from the signal and develops a voltage signal which is amplified by an amplifier 134 and rectified by a rectifier 135. The resulting D. C. voltage is fed to ground over a path including lead 136 and the winding of a relay 154. A third message signal to which a pilot tone has been applied is fed over lead 137 to a pilot tone filter 138 which operates to filter the pilot tone from the signal and develops a voltage signal which is amplified by a amplifier 139 and rectified by a rectifier 140. The resulting D. C. voltage is fed to ground over a path including lead 141 and the winding of a relay 155. The windings of relays 150, 151, 152, 153, 154 and 155 are, therefore, energized and the relays are operated. The relays 150, 151 and 152 constitute the relay control 104 shown in Figure 1*a*, while the relays 153, 154 and 155 constitute the relay control 130 shown in Figure 1*b*.

A path is completed from the positive terminal 156 of a source of potential, not shown, to ground including the winding of relay 157, lead 158, the closed contacts 173 of relay 153, the closed contacts 174 of relay 154 and the closed contacts 175 of relay 155, the contacts of the relays being connected in series. A path is also completed from the positive terminal 156 to ground including the winding of relay 159, lead 160, the closed contacts 176 of relay 152, the closed contacts 177 of relay 151 and the closed contacts 178 of relay 150, the contacts of the relays being connected in series. The windings of relays 157 and 159 are, therefore, energized and relays 157 and 159 are operated.

The switching circuit, as shown in Figure 1*a*, includes a control switch 143 which is shown in Figure 2*a* as a single throw-double pole switch. The control switch 143 includes a pair of wiper arms 161 and 162 which are connected together by a common mechanical connection 163, in a manner well known in the art. The wiper arms 161 is arranged to be selectively operated between a contact 164 and a contact 165. The wiper arm 162 is arranged to be operated between contacts 166 and 167 simultaneously with the operation of wiper arm 161.

An operator at the receiving station selects the particular one of the two multiplex transmission systems which he wishes to utilize. It will be first assumed that the operator determines to utilize the first multiplex transmission system including the radio frequency transmitter A and the radio receiver A. The mechanical connection 163 of the control switch 143 is operated to position the wiper arm 161 at contact 164 and the wiper arm 162 at contact 166.

As shown in Figures 2*a* and 2*b*, the switching circuit includes twenty-four hybrid transformers. The operation of hybrid transformers is well known in the art and need not be described in detail at this time. As described above, a particular message signal is simultaneously fed from radio receiver A over one of the leads A1 through A24 and from radio receiver B over one of the leads B1 through B24 at the receiving station. The respective leads over which the same message signal is fed simultaneously are connected to a single one of the hybrid transformers. Inasmuch as the operation of all of the hybrid transformers included in the switching circuit is similar, the operation of only the first one, hybrid transformer 179, shown in Figure 2*a*, will be described. It is to be understood, however, that the operation of the other hybrid transformers is the same. The hybrid transformer 179 includes two primary windings 180 and 181 and a secondary winding 182. As the same message signal is fed simultaneously over the leads A1 and B1, the leads A1 and B1 are connected to the first hybrid transformer 179. The primary winding 180 is connected across the lead A1, the primary winding 181 being connected across the lead B1. One side of lead A1 is connected to an armature 183 of transfer contacts of relay 184 via lead 216 and through a resistor 215 to a mid-point between the primary windings 180 and 181. The armature 183 is arranged to be moved by the operation of relay 184 between two oppositely disposed contacts 185 and 186. The other side of lead A1 is connected to contact 185 of the relay 184. One side of lead B1 is also connected to the armature 183 of relay 184 via lead 216 and through resistor 215 to the mid-point between the primary windings 180 and 181 of the hybrid transformer 179. The other side of lead B1 is connected to contact 186 of the relay 184. The hybrid transformer 179 operates in such a manner that the message signal fed over lead A1 and the message signal fed over lead B1 are isolated from one another. As is well known in the operation of hybrid transformers, there will be no crosstalk between the leads A1 and B1. When relay 184 is inoperative, armature 183 engages contact 186. A short circuit through the transfer contacts including armature 183 and contact 186 is, therefore, placed across lead B1. The hybrid transformer 179 operates to inductively couple the message signal fed over lead A1 from the primary winding 180, which is connected across lead A1, to the secondary winding 182 of the transformer. The message signal is fed from the secondary winding 182 over lead 25 to a receiving device.

On the other hand, when relay 184 is operated, armature 183 disengages contact 186 and engages contact 185 of the relay 184. A short circuit through the transfer contacts including armature 183 and contact 185 is placed across lead A1. The short circuit previously placed through armature 183 and contact 186 of relay 184 across lead B1 is removed. The message signal fed over lead B1 is inductively coupled from the primary winding 181, which is connected across lead B1, to the secondary winding 182 and the message signal is fed from the secondary winding 182 to a receiving device over lead 25. The operation of the hybrid transformer 179 is such that only one of the message signals fed thereto, either over lead A1 or B1, is fed to a receiving device. The hybrid transformer cannot operate to simultaneously pass the message signal fed over the lead A1 and the message signal fed over the lead B1 to the receiving device. The operation of the relay 184, by short circuiting one of the leads A1 or B1, determines which of the message signals transmitted over the leads is to be passed through the hybrid transformer 179 to a receiving device.

Similarly, leads A2 and B2 are connected to a hybrid transformer 217, the output circuit of which is connected to a receiving device via lead 26; leads A3 and B3 are connected to a hybrid transformer 218, the output circuit of which is connected to a receiving device via lead 27; leads A4 and B4 are connected to a hybrid transformer 219, the output circuit of which is connected to a receiving device via lead 28; leads A5 and B5 are connected to a hybrid transformer 220, the output circuit of which is connected to a receiving device via lead 29; leads A6 and B6 are connected to a hybrid transformer 221, the output circuit of which is connected to a receiving device via lead 30; leads A7 and B7 are connected to a hybrid transformer 222, the output circuit of which is connected to a receiving device via lead 31; leads A8 and B8 are connected to a hybrid transformer 223, the output circuit of which is connected to a receiving device via lead 32; leads A9 and B9 are connected to a hybrid transformer 224, the output circuit of which is connected to a receiving device via lead 33; leads 10 and B10 are connected to a hybrid transformer 225, the output circuit of which is connected to a receiving device via lead 34; leads A11 and B11 are connected to a hybrid transformer 226, the output circuit of which is connected to a receiving device via lead 35; leads A12 and B12 are connected to a hybrid transformer 227, the output circuit of which is connected to a receiving device via lead 36; leads A13 and B13 are connected to a hybrid transformer 228, the output circuit of which is connected to a receiving device via lead 37; leads A14 and B14 are connected to a hybrid transformer 229, the output circuit of which is connected to a receiving device via lead 38; leads A15 and B15 are connected to a hybrid transformer 230, the output circuit of which is connected to a receiving device via lead 39; leads A16 and B16 are connected to a hybrid transformer 231, the output circuit of which is connected to a receiving device via lead 40; leads A17 and B17 are connected to a hybrid transformer 232, the output circuit of which is connected to a receiving device via lead 41; leads A18 and B18 are connected to a hybrid transformer 233, the output circuit of which is connected to a receiving device via lead 42; leads A19 and B19 are connected to a hybrid transformer 234, the output circuit of which is connected to a receiving device via lead 43; leads A20 and B20 are connected to a hybrid transformer 235, the output circuit of which is connected to a receiving device via lead 44; leads A21 and B21 are connected to a hybrid transformer 236, the output circuit of which is connected to a receiving device via lead 45; leads A22 and B22 are connected to a hybrid transformer 237, the output circuit of which is connected to a receiving device via lead 46; leads A23 and B23 are connected to a hybrid transformer 238, the output circuit of which is connected to a receiving device via lead 47; leads A24 and B24 are connected to a hybrid transformer 239, the output circuit of which is connected to a receiving device via lead 48.

Leads A2 and B2, A3 and B3, A4 and B4, A5 and B5, A6 and B6 are connected through the respective hybrid transformers to separate transfer contacts of relay 184 in exactly the same manner as the leads A1 and B1 are connected through hybrid transformer 179 to the first transfer contacts of relay 184, including armature 183 and contacts 185 and 186. Leads A7 and B7, A8 and B8, A9 and B9, A10 and B10, A11 and B11, A12 and B12 are connected through the respective hybrid transformers to separate transfer contacts of relay 188 in exactly the same manner as the leads A1 and B1 are connected through the hybrid transformer 179 to one of the transfer contacts of relay 184. Leads A13 and B13, A14 and B14, A15 and B15, A16 and B16, A17 and B17, A18 and B18 are connected through the respective hybrid transformers to separate transfer contacts of relay 189 in the same manner as leads A1 and B1 are connected through the hybrid transformer 179 to one of the transfer contacts of relay 184. Leads A19 and B19, A20 and B20, A21 and B21, A22 and B22, A23 and B23, A24 and B24 are connected through the respective hybrid transformers to separate transfer contacts of relay 190 also in the same manner as the leads A1 and B1 are connected through the hybrid transformer 179 to one of the transfer contacts of relay 184. While four relays 184, 188, 189 and 190 are shown, each including six transfer contacts, it is to be understood that the arrangement is given only by way of example. The number of relays used is entirely discretionary and the twenty-four transfer contacts may be divided among any number of relays desired.

When relays 184, 188, 189 and 190 are inoperative, a short circuit is completed through the transfer contacts of the relays across the leads B1 through B24 and the message signals fed over leads A1 through A24 from radio receiver A will be fed to separate receiving devices at the receiving station. When relays 184, 188, 189 and 190 are operated, a short circuit is completed through the transfer contacts of the relays across leads A1 through A24 and the message signals fed over leads B1 through B24 from radio receiver B are fed to the separate receiving devices at the receiving station. The windings of relays 184, 188, 189 and 190 are connected in parallel via leads 206 and 240 and are operated simultaneously.

The operating circuit of relays 184, 188, 189 and 190 includes the contacts 205 of relay 169. When relay 169 is inoperative, the contacts 205 are in an open condition breaking the operating circuit of the relays 184, 188, 189 and 190 and maintaining the relays in an inoperative condition. However, when relay 169 is operative, a path is completed from a positive terminal 187 of a source of potential, not shown, to ground including the closed contacts 205 of relay 169, lead 206, the windings of relays 184, 188, 189 and 190 and lead 240. The windings of relays 184, 188, 189 and 190 are energized and the relays are operated. It has been assumed that an operator at the receiving station has operated the control switch 143 to control the sequence of operation of the switching circuit to pass the message signals transmitted over the first multiplex transmission system including radio receiver A and fed from the radio receiver A over leads A1 through A24 to receiving devices at the receiving station. Wiper arm 162 is positioned at contact 166 of the control switch 143. A path is completed from the wiper arm 162 to ground including lead 168, the winding of relay 169 and the closed contacts 204 of relay 170. The contact 166 is connected to the open contacts 171 of relay 172 via lead 241. The operating circuit of relay 172 includes the contacts 197 of relay 159. As has been previously mentioned, relay 159 is operated and the operation of relay 159 opens the contacts 197 thereof. The operating circuit of relay 172 is broken and relay 172 is held in an inoperative condition, maintaining contacts 171 of relay 172 in an open condition.

The operating circuit of relay 169 is broken by the open condition of contacts 171 of relay 172. As relay 169 is inoperative, relays 184, 188, 189 and 190 are also inoperative due to the open condition of contacts 205 of relay 169. As relays 184, 188, 189 and 190 are inoperative, the leads B1 through B24 are short circuited through the transfer contacts of the relays and the message signals fed over leads A1 through A24 from radio receiver A are fed through the respective hybrid transformers to separate receiving devices. The message signals transmitted by the transmitting devices 50 at the transmitting station of the radio communication system over the first multiplex transmission system including radio frequency transmitter A and radio receiver A are fed to the receiving devices at the receiving station.

The operation of the multiplex transmission system including radio frequency transmitter A and radio receiver A may for some reason be interrupted. For example, the radio equipment included in the transmission system may break down. The radio frequency transmitter A or radio receiver A may become inoperative due to the failure of certain components thereof. On the other hand, relay station 90 may become inoperative due to the breakdown of certain components thereof. Any part of the equipment included in the transmission system may become inoperative interrupting the operation of the system. Assuming that the equipment is operating properly, the signal transmitted over the transmission system may be distorted or faded by atmospheric conditions or by electrical interference so that a signal of the necessary amplitude and quality is not received by the radio receiver A. The pilot tones transmitted over the first transmission system with the message signals will, of course, be of the same characteristics as the message signals. When the operation of the transmission system is interrupted, the pilot tones will no longer be received and filtered from the message signals by the operation of the output circuits of the pilot tone filters 101, 107, and 112. Even though a signal of low amplitude but of sufficient amplitude to be received by the radio receiver A is received, the output circuits of the pilot tone filters 101, 107 and 112 and the operating level of the amplifiers and rectifiers associated therewith are set to be non-responsive to pilot tones which are of an amplitude below a certain level. Although the pilot tones and, therefore, the message signals are being received, the pilot tone circuits, by being non-responsive to pilot tones below a certain amplitude, indicate the low amplitude of the signal before the signal received by the radio receiver A fades below the usable limits of the automatic volume control circuits of the receivers employed. In this manner, as will be described below, the switching circuit at the receiving station automatically operates to transfer in operation from one of the multiplex transmission systems to the other before the operation of one of the transmission systems in use is completely interrupted by the fading of the signal transmitted over the system. The operation of the radio communication system will not, therefore, be interrupted by the fading out of the signal, even momentarily, as the switching circuit will have already transferred to the other transmission system before the operation of the transmission system in use is interrupted.

When the operation of the first multiplex transmission system including radio receiver A is interrupted, the pilot tones transmitted over the transmission system will also be interrupted. As message signals to which pilot tones have been applied are no longer fed to the pilot tone circuits, the pilot tone circuits will cease operation. The windings of relays 150, 151 and 152 connected to the output circuits of the pilot tone filters 101, 107 and 112, respectively, will be deenergized. Upon the inactivation of relays 150, 151 and 152, the operating circuit of relay 159 will be broken by the opening of contacts 178 of relay 150, the opening of contacts 177 of relay 151 and the opening of contacts 176 of relay 152. While the three relays 150, 151 and 152 must be operated for relay 159 to operate, it should be noted at this time that it is not necessary for all of the three relays 150, 151 and 152 to be inactivated to break the operating circuit of relay 159. As the contacts of the three relays are connected in series, the operating circuit of relay 159 will be broken when any one of the relays 150, 151 or 152 is inactivated. It is possible that only a portion of the signal transmitted over the first multiplex transmission system including radio receiver A will be interrupted. For example, as shown in Figure 1*a*, modulator 58 at the transmitting station or demodulator 96 may break down. In this situation, the message signals fed over leads A9 through A16 will be interrupted. The pilot tone normally applied to the message signal fed over lead A9 will also be interrupted and the output circuit of the pilot tone filter 107 at the receiving station will indicate this interruption by ceasing to feed a voltage signal to the winding of relay 151. Relay 151 will be inactivated breaking the operating circuit of relay 159, inactivating relay 159. In the same manner, if one of the other modulators 52, 55, 57, 60 or 62 at the transmitting station or one of the other demodulators 94 or 99 at the receiving station break down, only one of the circuits of the pilot tone filters 101, 107, or 112 will cease to feed a voltage signal to the winding of the relay connected to the output circuit thereof, indicating that that portion of the signal transmitted over the transmission system utilized has been interrupted. Suitable indicating means such as lamps, may be included in the operating circuits of the relays 150, 151 and 152 to provide a visual indication when one, two or all of the relays are inactivated. Some indication will, therefore, be given as to the portion of the transmission system which has failed to operate properly, bringing about an interruption in the operation of the transmission system.

When the relay 159 is inactivated due to an interruption in the operation of the first multiplex transmission system including radio receiver A, a path is completed from the positive terminal 156 to ground including lead 191, reset switch 192, wiper arm 161 and contact 164 of control switch 143, lead 193, lead 194, the closed contacts 197 of relay 159, lead 195, the winding of relay 172, the closed contacts 173 of relay 153, the closed contacts 174 of relay 154 and the closed contacts 175 of relay 155. The winding of relay 172 is energized and relay 172 is operated. A path is completed from the positive terminal 196 of a source of potential, not shown, to ground including the closed contacts 171 of relay 172, lead 241, contact 166 and wiper arm 162 of control switch 143, lead 168, the winding of relay 169 and the closed contacts 204 of relay 170. The winding of relay 169 is energized and relay 169 is operated. A path is completed from the positive terminal 187 to ground including the closed contacts 205 of relay 169, lead 206, the windings of relays 184, 188, 189 and 190 and lead 240. The windings of relays 184, 188, 189 and 190 are energized and the relays are operated. Upon the operation of the relays 184, 188, 189 and 190, the transfer contacts of the relays will operate to remove the short circuits across the leads B1 through B24 and to place a short circuit across the leads A1 through A24. The message signals fed over leads B1 through B24 from radio receiver B are fed through the respective hybrid transformers included in the switching circuit at the receiving station to separate receiving devices. Therefore, the message signals transmitted by the transmitting devices 50 at the transmitting station over the second multiplex transmission system including radio frequency transmitter B and radio receiver B will be fed by the operation of the switching circuit at the receiving station to the receiving devices.

A feature of the invention is the fact that when the switching circuit is automatically transferred in operation from one of the multiplex transmission systems, the operation of which has been interrupted, to the other of the two multiplex transmission systems, the switching circuit will not automatically transfer in operation back to the transmission system originally utilized, if the operation of the system originally utilized is resumed. If the operation of the first multiplex transmission system including radio receiver A is resumed, relay 159 is reoperated. As the control switch 143 has been operated to cause the switching circuit to pass the message signals transmitted over the first transmission system including radio receiver A to the receiving devices at the receiving station, it could be expected that when the operation of the first transmission system including receiver A was resumed, the switching circuit would be operated automatically to transfer back in operation to that system. Such a transfer in the operation of the switching circuit, however, is unnecessary, as the radio communication system is operating satisfactorily by the use of the second multiplex transmission system including radio receiver B. Once the switching circuit selects one of the multiplex transmission systems for use, the circuit continues to make use of that system until the operation of that system is interrupted or until the switching circuit is reset manually so as to be transferred in operation to the other transmission system.

When relay 172 is operated, a path is completed from the positive terminal 156 to ground including lead 191, reset switch 192, wiper arm 161 and contact 164 of control switch 143, lead 193, lead 194, closed contacts 198 of relay 172, the winding of relay 172, lead 158, closed contacts 173 of relay 153, closed contacts 174 of relay 154 and closed contacts 175 of relay 155. A holding circuit is completed for relay 172. When relay 159 is reoperated, upon the resumption of the operation of the first transmission system including radio receiver A, the contacts 197 of relay 159 will open. The contacts 197 are in the original operating circuit of relay 172. Because of the holding circuit through the closed contacts 198 of relay 172, relay 172 remains operated even though contacts 197 of relay 159 are opened breaking the original operating circuit of the relay. The path from the positive terminal 196 to ground including the winding of relay 169 is maintained and relays 184, 188, 189 and 190 are held in an operated condition. The message signals fed over leads B1 through B24 from radio receiver B are passed through the switching circuit to the receiving devices. Thus the system is termed a non-hunting system.

If the operator at the receiving station should wish to transfer back to the first multiplex transmission system including radio receiver A following the resumption of the operation thereof, he merely pushes the reset switch 192. The reset switch 192 is in the operating circuit of relay 172 and a momentary opening of the switch 192 breaks the operating circuit, inactivating relay 172. Upon the inactivation of relay 172, the operating circuit of relay 169 is broken by the opening of contacts 171 of relay 172. Relay 169 is inactivated and contacts 205 of relay 169 open breaking the operating circuit of relays 184, 188, 189 and 190. Relays 184, 188, 189 and 190 are inactivated and the message signals fed over leads A1 through A24 from radio receiver A are fed to the receiving devices at the receiving station, the leads B1 through B24 being short circuited by the transfer contacts of the relays.

Up to this point it has been assumed that an operator has operated the control switch 143 to operate the switching circuit to pass the message signals fed over leads A1 through A24 from radio receiver A to the receiving devices at the receiving station. It will now the assumed that the operator operates the control switch 143 to operate the switching circuit to pass the message signals fed over leads B1 through B24 from radio receiver B to the receiving devices at the receiving station, the message signals fed over leads B1 through B24 having been transmitted over the second multiplex transmission system including radio frequency transmitter B and radio receiver B. The wiper arm 161 is positioned at contact 165 and armature 162 is positioned at contact 167 by the operation of the mechanical connection 163 of the control switch 143. It will also be assumed that a signal of proper amplitude and quality is being transmitted over both of the multiplex transmission systems of the radio communication system. Relay 157 is operated by a control signal fed to the winding thereof from the relay arrangement including relays 153, 154 and 155 which are connected in the output circuits of the pilot tone filters 127, 133 and 138, respectively. Relay 159 is operated by a control signal fed to the winding thereof from the relay arrangement including relays 152, 151 and 150 which are connected in the output circuits of the pilot tone filters 112, 107 and 101, respectively. A path is completed from the positive terminal 156 to ground including the closed contacts 199 of relay 157, lead 200, the closed contacts 201 of relay 202, lead 203, contact 167 and wiper arm 162 of control switch 143, lead 168, the winding of relay 169 and closed contacts 204 of relay 170. The winding of relay 169 is energized and relay 169 is operated. Upon the operation of relay 169, contacts 205 of relay 169 are closed and the path is completed from the positive terminal 187 to ground including closed contacts 205, lead 206, the windings of relays 184, 188, 189 and 190 and lead 240. Relays 184, 188, 198 and 190 operate and the leads A1 through A24 are short circuited through the transfer contacts of the relays. The message signals fed over leads B1 through B24 from radio receiver B are passed through the switching circuit to the receiving devices at the receiving station.

The operation of the second multiplex transmission system including radio receiver B may be interrupted due to a breakdown in the radio equipment included in the transmission system or due to atmospheric conditions, as was discussed previously in connection with the interruption of the operation of the first multiplex transmission system including radio receiver A. Both of the multiplex transmission systems are subject to the interruption by the same causes and, therefore, the discussion previously given need not be repeated. However, it is to be remembered that the two transmission systems operate at different frequencies and over individual paths of transmission. It is not likely, therefore, that atmospheric conditions or electrical interference will simultaneously bring about the interruption of both of the transmission systems. Further, as none of the radio equipment included in the radio communication system is utilized by both of the transmission systems, it is also unlikely that both systems will be simultaneously interrupted by a breakdown of the radio equipment included in the communication system.

It has been assumed that a signal of proper amplitude and quality is being transmitted over the first multiplex transmission system including radio frequency transmitter A and radio receiver A. When the operation of the second multiplex transmission system including radio receiver B is interrupted, relay 157 is inactivated in that a control signal will no longer be fed to the winding thereof by the operation of the relays 153, 154 and 155 which are connected in the output circuits of the pilot tone filters 127, 133 and 138, respectively. The operating circuit of relay 169 is broken by the opening of contacts 199 of relay 157 and relay 169 will be inactivated. Upon the inactivation of relay 169, the operating circuit of relays 184, 188, 189 and 190 is broken by the opening of contacts 205 of relay 169. The relays 184, 188, 189 and 190 are inactivated. The leads B1 through B24 are short circuited through the transfer contacts of relays 184, 188, 189 and 190 and the message signals fed over leads A1 through A24 from radio receiver A are passed by the switching circuit to the receiving devices at the receiving station.

Upon the inactivation of relay 157, a path is completed from the positive terminal 156 to ground including lead 191, reset switch 192, wiper arm 161 and contact 165 of control switch 143, lead 207, lead 208, the closed contacts 209 of relay 157, lead 210, the winding of relay 202, lead 160, the closed contacts 176 of relay 152, the closed contacts 177 of relay 151 and the closed contacts 178 of relay 150. The winding of relay 202 is energized and relay 202 is operated. A path is completed from the positive terminal 156 to ground including lead 191, reset switch 192, wiper arm 161 and contact 165 of control switch 143, lead 207, lead 208, the closed contacts 211 of relay 202, the winding of relay 202, lead 160, closed contacts 176 of relay 152, closed contacts 177 of relay 151 and the closed contacts 178 of relay 150. A holding circuit is provided for relay 202 through the closed contacts 211 of the relay. If the operation of the second multiplex transmission system including radio receiver B is resumed, relay 157 will be operated. The operation of relay 157 opens the contacts 209 of relay 157 which are in the original operating circuit of relay 202. Relay 202 will remain operated by the holding circuit including the closed contacts 211 of relay 202. The contacts 201 of relay 202, in the operating circuit of relay 169, will be held open by the continued operation of relay 202 and the operating circuit of relay 169 will, therefore, continue to be broken. As relay 169 is inactivated, relays 184, 188, 189 and 190 are also inactivated. The message signals fed over leads A1 through A24 from radio receiver A will continue to be passed through the switching circuit to the receiving devices at the receiving station. The leads B1 through B24 are short circuited through the transfer contacts of the relays. The switching circuit, therefore, is locked in such a manner that it will continue to pass the message signals transmitted over the first multiplex transmission system including radio frequency transmitter A and radio receiver A until the operation of the system is interrupted or until the switching circuit is manually operated to transfer in operation to the second multiplex transmission system including radio frequency transmitter B and radio receiver B. It is to be noted that the switching circuit is operated in this manner even though the control switch 143 was originally operated to control the operation of the switching circuit to pass the message signals transmitted over the second multiplex transmission system including radio frequency transmitter B and radio receiver B to the receiving devices at the receiving station.

If the operator at the receiving station wishes to alter the operation of the switching circuit so that it will pass the message signals fed over leads B1 through B24 from radio receiver B to the receiving devices at the receiving station, he need only operate the reset switch 192. The reset switch 192 is included in the operating circuit of relay 202 and, when the reset switch 192 is opened momentarily, the winding of relay 202 is deenergized and relay 202 is inactivated. Upon the inactivation of relay 202, a path is completed from the positive terminal 156 to ground including the closed contacts 199 of relay 157, lead 200, the closed contacts 201 of relay 202, lead 203, contact 167 and wiper arm 162 of control switch 143, lead 168, the winding of relay 169 and the closed contacts 204 of relay 170. The winding of relay 169 is energized and relay 169 is operated. Contacts 205 of relay 169 close completing the operating circuit of relays 184, 188, 189 and 190. The relays 184, 188, 189 and 190 operate and leads A1 through A24 are short circuited through the transfer contacts of the relays. The message signals fed over leads B1 through B24 from radio receiver B are passed through the switching circuit to the receiving devices at the receiving station.

In the discussion up to this point, it has been assumed that a signal of proper amplitude and quality is being transmitted over at least one of the two multiplex transmission systems included in the radio communication system of the invention. It is possible, however, that, due to a breakdown of the radio equipment included in the radio communication system or due to atmospheric conditions, the operation of both transmission systems will be interrupted at the same time. If this occurs, all of the relays of the switching circuit will be immediately inactivated. If the operation of both of the transmission systems is thereafter simultaneously resumed, relays 157 and 159 will be reoperated. The operation of the switching circuit will depend upon the operation of the control switch 143. If the mechanical connection 163 of the control switch 143 has been operated to position the wiper arm 161 at contact 164 and, therefore, the wiper arm 162 at contact 166, the switching circuit will operate to pass the message signals fed over leads A1 through A24 from radio receiver A to the receiving devices at the receiving station. On the other hand, if the mechanical connections 163 has been operated to position the wiper arm 161 at contact 165 and, therefore, wiper arm 162 at contact 167, the switching circuit will operate to pass the message signals fed over leads B1 through B24 from radio receiver B to the receiving devices at the receiving station. The operation of the switching circuit in accordance with the selective operation of the control switch 143 when both of the relays 157 and 159 are operated has previously been described in detail and will not be repeated at this time.

Following the simultaneous interruption in the operation of both of the multiplex transmission systems, the operation of only one of the systems may be resumed. It will be first assumed that the mechanical connection 163 of control switch 143 has been operated to position wiper arm 161 at contact 164 and wiper arm 162 at contact 166. If the operation of the first multiplex transmission system including radio receiver A is resumed, relay 159 is operated, relay 157 remaining inactivated. Relays 202 and 172 also remain inactivated. The operating circuit of relay 169 through the control switch 143 is broken by the open condition of contacts 171 of relay 172. Relay 169 will remain inactivated. Relays 184, 188, 189 and 190 also remain inactivated in that the operating circuit thereof is broken by the open condition of contacts 205 of relay 169. The message signals fed over leads A1 through A24 from radio receiver A are passed through the switching circuit to the receiving devices at the receiving station. The leads B1 through B24 are short circuited through the transfer contacts of the relays 184, 188, 189 and 190. On the other hand, if the operation of the second multiplex transmission system including radio receiver B is resumed, relay 157 is operated, relays 159 and 202 remaining inactivated. A path is completed from the positive terminal 156 to ground including lead 191, reset switch 192, the wiper arm 161 and contact 164 of control switch 143, lead 193, lead 194, the closed contacts 197 of relay 159, lead 195, the winding of relay 172, lead 158, closed contacts 173 of relay 153, closed contacts 174 of relay 154 and closed contacts 175 of relay 155. The winding of relay 172 is energized and relay 172 is operated. A path is completed from the positive terminal 196 to ground including the closed contacts 171 of relay 172, lead 241, contact 166 and wiper arm 162 of control switch 143, lead 168, the winding of relay 169 and the closed contacts 204 of relay 170. The winding of relay 169 is energized and relay 169 is operated. Upon the operation of relay 169, the path is completed from the positive terminal 187 to ground including the closed contacts 205 of relay 169, lead 206, the windings of relays 184, 188, 189 and 190 and lead 240. Relays 184, 188, 189 and 190 are operated and the message signals fed over leads B1 through B24 from the radio receiver B are passed through the switching circuit to the receiving devices at the receiving station. The leads A1 through A24 are short circuited through the transfer contacts of the relays 184, 188, 189 and 190. As previously described, when relay 172 is operated, a holding circuit is completed through the closed contacts 198 of relay 172. The switching circuit, therefore, will continue to pass the message signals fed over leads B1 through B24 from radio receiver B to the receiving devices at the receiving station, even though the operation of the first multiplex transmission system including radio receiver A should be later resumed. It may be seen that even though the control switch 143 has been operated to control the operation of the switching circuit to pass the message signals fed from the radio receiver A to the receiving devices at the receiving station, the switching circuit will automatically operate to feed the message signals fed from the radio receiver included in the transmission system which first resumes operation. If the operation of the second transmission system including radio receiver B is first resumed, the operation of the switching circuit is locked in such a manner that it will continue to feed the message signals fed over leads B1 through B24 from radio receiver B to the receiving devices at the receiving station even though the operation of the first multiplex transmission system including radio receiver A should be later resumed.

It will now be assumed that the mechanical connection of control switch 143 has been operated to position wiper arm 161 at contact 165 and wiper arm 162 at contact 167. If the operation of the second multiplex transmission system including radio receiver B is resumed, relay 157 is operated, relays 159, 202 and 172 remaining inactivated. A path is completed from the positive terminal 156 to ground including the closed contacts 199 of relay 157, lead 200, closed contacts 201 of relay 202, lead 203, contact 167 and wiper arm 162 of control switch 143, lead 168, the winding of relay 169 and the closed contacts 204 of relay 170. The winding of relay 169 is energized and relay 169 is operated. Upon the operation of relay 169, the operating circuit of relays 184, 188, 189 and 190 is completed by the closure of contacts 205 of relay 169. Relays 184, 188, 189 and 190 are operated and the message signals fed over leads B1 through B24 from radio receiver B are passed through the switching circuit to the receiving devices at the receiving station. The leads A1 to A24 are short circuited through the transfer contacts of the relays 184, 188, 189 and 190.

On the other hand, if the operation of the first multiplex transmission system including radio receiver A is resumed, relay 159 is operated, relays 157 and 172 remaining inactivated. A path is completed from the positive terminal 156 to ground including lead 191, reset switch 192, the wiper arm 161 and contacts 165 of control switch 143, lead 207, lead 208, closed contacts 209 of relay 157, lead 210, the winding of relay 202, lead 160, the closed contacts 176 of relay 152, closed contacts 177 of relay 151 and closed contacts 178 of relay 150. The winding of relay 202 is energized and relay 202 is operated. Upon the operation of relay 202, contacts 201 of relay 202 will open. As the contacts 201 of relay 202 are in the operating circuit of relay 169, the opening of contacts 201 breaks the operating circuit of relay 169. Relay 169 will remain inactivated, as will relays 184, 188, 189 and 190, due to the open condition of contacts 205 of relay 169. The message signals fed over leads A1 through A24 from radio receiver A are passed through the switching circuit to the receiving devices at the receiving station. The leads B1 through B24 are short circuited through the transfer contacts of relays 184, 188, 189 and 190. When relay 202 operates, a holding circuit for relay 202 is completed through closed contacts 211 of relay 202. Even though the control switch 143 has been operated to control the operation of the switching circuit to pass the message signals fed over leads B1 through B24 from radio receiver B to the receiving devices at the receiving station, the switching circuit automatically operates to feed the message signals fed over the leads from the radio receiver included in the transmission system that first resumes operation. If the operation of the first multiplex transmission system including radio receiver A is first resumed, relay 202 being held operated by the holding circuit including closed contacts 211 of relay 202, the switching circuit is locked in such a manner that it will continue to pass the message signals fed over leads A1 through A24 from radio receiver A to the receiving devices at the receiving station, even though the operation of the second multiplex transmission system including radio receiver B should be later resumed.

The switching circuit also includes a control switch 243. The control switch 243 includes a wiper arm 244 and contacts 245, 246 and 247. When the wiper arm 244 is positioned at contact 245, the control switch 243 is held in a standby condition and the operation of the switching circuit will not be affected in any manner. The operator at the receiving station may desire to prevent the switching circuit from automatically transferring in operation between the two multiplex transmission systems of the radio communication system. The control switch 243 is operated to disable the automatic operation of the switching circuit. This may be desirable if the switching circuit itself fails causing improper selection of a usable transmission system. This would also be desirable in a situation where a partial failure in the operation of both transmission systems occurs. In this situation, the use of control switch 243 permits an operator to choose the most usable of the two partially failed transmission systems, and, by the operation of control switch 243, to lock the operation of the switching circuit to the transmission system chosen. Assuming that the operator in such a situation desires to connect the receiving devices at the receiving station through the switching circuit to the leads A1 through A24 over which message signals are fed from the radio receiver A, the operator will position the wiper arm 244 at the contact 246 of the control switch 243. A path is completed from the positive terminal 156 to ground including lead 191, the wiper arm 244 and contact 246 of control switch 243, lead 248 and the winding of relay 170. The winding of relay 170 is energized and relay 170 is operated. The contacts 204 of relay 170 are opened, thus breaking the operating circuit of relay 169. Relay 169, therefore, cannot be operated under any condition. The contacts 205 of relay 169 will remain open, breaking the operating circuit of relays 184, 188, 189 and 190. The leads A1 through A24 over which message signals are fed from radio receiver A will continue to be connected to the receiving devices at the receiving station through the switching circuit, whether or not a signal of the proper amplitude and quality is being transmitted over the first multiplex transmission system including radio receiver A.

If the operator at the receiving station desires to connect the receiving devices at the receiving station to the leads B1 hrough B24 over which message signals are fed from the radio receiver B and to maintain the connection whether or not a signal of the proper amplitude and quality is being transmitted over the second multiplex transmission system including radio receiver B, wiper arm 244 is positioned at contact 247 of the control switch 243. A path is completed from the positive terminal 156 to ground including lead 191, wiper arm 244 and contact 247 of control switch 243, lead 249, lead 168, the winding of relay 169 and closed contacts 204 of relay 170. The winding of relay 169 is energized and relay 169 is operated. The operating circuit of relays 184, 188, 189 and 190 is completed through the closed contacts 205 of relay 169 and relays 184, 188, 189 and 190 are operated. The leads B1 through B24 over which message signals are fed from radio receiver B through the switching circuit to receiving devices at the receiving station will continue to be connected to the receiving devices whether or not a signal of the proper amplitude and quality is being transmitted over the second multiplex transmission system including radio receiver B. The control switch 243, therefore, may be operated, if desired, to completely disable the automatic operation of the switching circuit.

The switching circuit shown in Figures 2*a* and 2*b* is arranged to pass the message signals fed over leads A1 through A24 from radio receiver A or the message signals fed over leads B1 through B24 from radio receiver B to the receiving devices at the receiving station. In other words, the switching circuit utilizes only one of the multiplex transmission systems at a time. The switching circuit could be arranged within the scope of the invention, however, to utilize message signals transmitted over both multiplex transmission systems. For example, a pilot tone could be applied to each of the twenty-four message signals transmitted simultaneously over the two multiplex transmission systems. Each of the message signals transmitted simultaneously over the two transmission systems would be received at and fed simultaneously from the two radio receivers located at the receiving station to a switching circuit which is arranged to operate in the same manner as the switching circuit shown in Figures 2*a* and 2*b*, there being twenty-four such switching circuits in all. In this manner, each message signal would be switched at the receiving station independently of the others. Each switching circuit would operate to manually or automatically select one of two message signals, which are actually the same message signal, fed thereto from the radio receiver included in one of the transmission systems and from the radio receiver included in the other of the transmission systems. The message signal selected would be passed from the switching circuit to a receiving device at the receiving station. Similarly, any desired number of switching circuits could be arranged at the receiving station and operated in response to pilot tones transmitted over each of the two multiplex transmission systems so that when only a portion of the message signals transmitted over one of the multiplex transmission systems was interrupted (for example, if one of the modulators 55, 58 or 62 located at the transmitting station shown in Figure 1*a* should break down), the message signals which were interrupted would be fed from the radio receiver included in the other multiplex transmission system to the receiving devices at the receiving station, assuming, of course, that the message signals transmitted over the other transmission system were of the proper amplitude and quality.

The radio communication system of the invention is particularly useful for point-to-point commercial telegraph communication where maximum reliability is of paramount importance.

Having described the invention, we claim:

1. A radio communication system comprising, in combination, a transmitting station including a transmitting device adapted to transmit a message signal, first and second transmission systems electrically interconnecting said transmitting station and a remote receiving station, each of said transmission systems individually including a radio frequency transmitter located at said transmitting station and a radio receiver located at said receiving station, means for operating said transmitting device to transmit said message signal simultaneously over said transmission systems to said radio receivers at said receiving station, means located at said transmitting station for applying a pilot tone to said message signal, an electromagnetic relay switching circuit located at said receiving station and including a first and second relay device, means for operating said first relay device in response to the reception at the receiving station of the pilot tone transmitted with the message signal over said first transmission system, means for operating said second relay device in response to the reception at the receiving station of the pilot tone transmitted with the message signal over said second transmission system, said receiving station including means for feeding said message signals from said radio receivers to said switching circuit, and means including a selectively operated control device for controlling the operation of said switching circuit in response to the operation of said relay devices to selectively operate said switching circuit to pass the message signal transmittel over only one of said transmission systems at a time to a receiving device at said receiving station.

2. A radio communication system comprising, in combination, a transmitting station including a plurality of transmitting devices adapted to simultaneously transmit different message signals, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, means for operating said transmitting devices to transmit said message signals simultaneously over said transmission system to said radio receivers at said receiving station, means located at said transmitting station for applying a pilot tone to predetermined ones of said message signals, an electromagnetic relay switching circuit located at said receiving station and including a first and a second relay device, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, and means for automatically controlling the operation of said switching circuit in accordance with the operation of said relay devices to selectively operate said switching circuit to pass the message signals transmitted over only one of said transmission system at a time to separate receiving devices at said receiving station, whereby said switching circuit when only one of said transmission systems is passing a usable signal is operated to pass the message signals transmitted over the usable transmission system to said separate receiving devices.

3. A point-to-point radio communication system as defined in claim 2, wherein said transmitting and receiving stations each include means for transmitting and receiving, respectively, both time division multiplex signals and frequency division multiplex signals, one transmission system passing the time division multiplex signals and the other transmission system passing the frequency division multiplex signals.

4. A radio communication system comprising, in combination, a transmitting station including a plurality of transmitting devices adapted to simultaneously transmit different message signals, said transmitting devices being operated to transmit said message signals simultaneously over a first and second electrical path, means for applying a pilot tone to predetermined ones of said message signals transmitted over said first electrical path, means for applying a pilot tone to predetermined ones of said message signals transmitted over said second electrical path, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, said first transmission system being operated to transmit said message signals transmitted over said first electrical path to a radio receiver at said receiving station, said second transmission system being operated to transmit said message signals transmitted over said second electrical path to a radio receiver at said receiving station, an electromagnetic relay switching circuit located at said receiving station and including a first and a second relay device, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, and means including a selectively operated control device for controlling the operation of said switching circuit in response to the operation of said relay devices to selectively operate said switching circuit to pass the message signals transmitted over only one of said transmission systems at a time to separate receiving devices at said receiving station.

5. A radio communication system comprising, in combination, a transmitting station including a plurality of transmitting devices adapted to simultaneously transmit different message signals, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, means for operating said transmitting devices to transmit said message signals simultaneously over said transmission systems to said radio receivers at said receiving station, means located at said transmitting station for applying a pilot tone to a predetermined plurality of said message signals, an electromagnetic relay switching circuit located at said receiving station including a first and a second relay device and a control switch, said control switch including a wiper arm and a plurality of operating positions, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, and means for controlling the operation of said switching circuit in response to the operation of said relay devices and in accordance with the positioning of said wiper arm at one of said operating positions to selectively operate said switching circuit to pass the message signals transmitted over only one of said transmission systems at a time to separate receiving devices at said receiving station.

6. A radio communication system comprising, in combination, a transmitting station including a transmitting device adapted to transmit a message signal, first and second transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, means for operating said transmitting device to transmit said message signal simultaneously over said transmission systems to said radio receivers at said receiving station, means located at said transmitting station for applying a pilot tone to said message signal, an electromagnetic relay switching circuit located at said receiving station and including a first and second relay device, means for operating said first relay device in response to the reception at the receiving station of the pilot tone transmitted with the message signal over said first transmission system, means for operating said second relay device in response to the reception at the receiving station of the pilot tone transmitted with the message signal over said second transmission system, said receiving station including means for feeding said message signals from said radio receivers to said switching circuit, means including a selectively operated control device for controlling the operation of said switching circuit in response to the operation of said first relay device to selectively operate said switching circuit to pass only the message signal transmitted over said first transmission system to a receiving device at said receiving station, said switching circuit being arranged to automatically operate upon the inactivation of said first relay device by an interruption of the pilot tone transmitted over said first transmission system and in response to the operation of said second relay device to pass only the message signal transmitted over said second transmission system to said receiving device.

7. A radio communication system comprising, in combination, a transmitting station including a plurality of transmitting devices adapted to simultaneously transmit different message signals, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, means for operating said transmitting devices to transmit said message signals simultaneously over said transmission systems to said radio receivers at said receiving station, means located at said transmitting station for applying a pilot tone to a predetermined plurality of said message signals, an electromagnetic relay switching circuit located at said receiving station and including first and second relay devices, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, means including a selectively operated control device for controlling the operation of said switching circuit in response to the operation of said first relay device to selectively operate said switching circuit to pass only the message signals transmitted over said first transmission system to separate receiving devices at said receiving station, said switching circuit being arranged to automatically operate upon the inactivation of said first relay device by an interruption of the pilot tones transmitted over said first transmission system and in response to the operation of said second relay device to pass only the message signals transmitted over said second transmission system to said separate receiving devices.

8. A radio communication system comprising, in combination, a transmitting station including a plurality of transmitting devices adapted to simultaneously transmit different message signals, said transmitting devices being operated to transmit said message signals simultaneously over a first and second electrical path, means for applying a pilot tone to predetermined ones of said message sginals transmitted over said first electrical path, means for applying a pilot tone to predetermined ones of said message signals transmitted over said second electrical path, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, said first transmission system being operated to transmit said message signals transmitted over said first electrical path to a radio receiver at said receiving station, said second transmission system being operated to transmit said message signals transmitted over said second electrical path to a radio receiver at said receiving station, an electromagnetic relay switching circuit located at said receiving station and including first and second relay devices, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, means including a selectively operated control device for controlling the operation of said switching circuit in response to the operation of said first relay device to selectively operate said switching circuit to pass only the message signals transmitted over said first transmission system to separate receiving devices at said receiving station, said switching circuit being arranged to automatically operate upon the inactivation of said first relay device by an interruption of the pilot tones transmitted over said first transmission system and in response to the operation of said second relay device to pass only the message signals transmitted over said second transmission system to said separate receiving devices.

9. A radio communication system comprising, in combination, a transmitting station including a plurality of transmitting devices adapted to simultaneously transmit different message signals, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, means for operating said transmitting devices to transmit said message signals simultaneously over said transmission systems to said radio receivers at said receiving station, means located at said transmitting station for applying a pilot tone to a predetermined plurality of said message signals, an electromagnetic relay switching circuit located at said receiving station including first and second relay devices and a control switch, said control switch including a wiper arm and a plurality of operating positions, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, means for controlling the operation of said switching circuit in response to the operation of said first relay device and in accordance with the positioning of said wiper arm at one of said operating positions to selectively operate said switching circuit to pass only the message signals transmitted over said first transmission system to separate receiving devices at said receiving station, said switching circuit being arranged to automatically operate upon the inactivation of said first relay device by an interruption of the pilot tones transmitted over said first transmission system and in response to the operation of said second relay device to pass only the message signals transmitted over said second transmission system to said separate receiving devices.

10. A radio communication system comprising, in combination, a transmitting station including a plurality of transmitting devices adapted to simultaneously transmit different message signals, said transmitting devices being operated to transmit said message signals simultaneously over a first and second electrical path, means for applying a pilot tone to predetermined ones of said message signals transmitted over said first electrical path, means for applying a pilot tone to predetermined ones of said message signals transmitted over said second electrical path, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, said first transmission system being operated to transmit said message signals transmitted over said first electrical path to a radio receiver at said receiving station, said second transmission system being operated to transmit said message signals transmitted over said second electrical path to a radio receiver at said receiving station, an electromagnetic relay switching circuit located at said receiving station including first and second relay devices and a control switch, said control switch including a wiper arm and a plurality of operating positions, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, means for controlling the operation of said switching circuit in response to the operation of said first relay device and in accordance with the positioning of said wiper arm at one of said operating positions to selectively operate said switching circuit to pass only the message signals transmitted over said first transmission system to separate receiving devices at said receiving station, said switching circuit being arranged to automatically operate upon the inactivation of said first relay device by an interruption of the pilot tones transmitted over said first transmission system and in response to the operation of said second relay device to pass only the message signals transmitted over said second transmission system to said separate receiving devices.

11. A radio communication system comprising, in combination, a transmitting station including a plurality of transmitting devices adapted to simultaneously transmit different message signals, said transmitting devices being operated to transmit said message signals simultaneously over a first and second electrical path, means for applying a pilot tone to predetermined ones of said message signals transmitted over said first electrical path, means for applying a pilot tone to predetermined ones of said message signals transmitted over said second electrical path, first and second multiplex transmission systems electrically interconnecting said transmitting station and a remote receiving station, each of said transmission systems individually including a radio frequency transmitter located at said transmitting station and a radio receiver located at said receiving station, said first transmission system operating at a frequency different from the frequency at which said second transmission system is operating, said first transmission system being operated to transmit said message signals transmitted over said first electrical path to a radio receiver at said receiving station, said second transmission system being operated to transmit said message signals transmitted over said second electrical path to a radio receiver at said receiving station, an electromagnetic relay switching circuit located at said receiving station including first and second relay devices and a control switch, said control switch including a wiper arm and a plurality of operating positions, means for operating said first relay device in response to the reception at the receiving station of the pilot tones transmitted with the message signals over said first transmission system, means for operating said second relay device in response to the reception at the receiving station of the pilot tones transmitted with the message signals over said second transmission system, said receiving station including means for separating the different message signals from the received multiplex signals and for feeding said different message signals from said radio receivers to said switching circuit, means for controlling the operation of said switching circuit in response to the operation of said first relay device and in accordance with the positioning of said wiper arm at one of said operating positions to selectively operate said switching circuit to pass only the message signals transmitted over said first transmission system to separate receiving devices at said receiving station, said switching circuit being arranged to automatically operate upon the inactivation of said first relay device by an interruption of the pilot tones transmitted over said first transmission system and in response to the operation of said second relay device to pass only the message signals transmitted over said second transmission system to said separate receiving devices, a third relay device included in said switching circuit and arranged to be operated upon the inactivation of said first relay device, the operation of said switching circuit being controlled upon the operation of said third relay device to cause said switching circuit to continue to pass only the message signals transmitted over said second transmission system to said separate receiving devices upon the restoration of the pilot tones transmitted over said first transmission system and the reoperation of said first relay device, the inactivation of said second relay device thereafter by an interruption of the pilot tones transmitted over said second transmission system causing said switching circuit to automatically operate in response to the prior reoperation of said first relay device to pass only the message signals transmitted over said first transmission system to said separate receiving devices.

References Cited in the file of this patent

UNITED STATES PATENTS

| | | |
|---|---|---|
| 1,922,059 | Ohl | Aug. 15, 1933 |
| 2,210,089 | Loughren | Aug. 9, 1940 |
| 2,555,557 | Peterson | June 5, 1951 |